United States Patent [19]
Conn, Jr.

[11] Patent Number: 6,067,508
[45] Date of Patent: May 23, 2000

[54] METHOD AND APPARATUS FOR MEASURING LOCALIZED TEMPERATURES ON INTEGRATED CIRCUITS

[75] Inventor: Robert O. Conn, Jr., Los Gatos, Calif.

[73] Assignee: Xilinx, Inc., San Jose, Calif.

[21] Appl. No.: 09/414,983

[22] Filed: Oct. 7, 1999

Related U.S. Application Data

[62] Division of application No. 09/047,192, Mar. 24, 1998, Pat. No. 6,002,991, which is a division of application No. 08/711,626, Aug. 30, 1996, Pat. No. 5,795,068.

[51] Int. Cl.$^7$ ...................................................... G01K 7/00
[52] U.S. Cl. ........................... 702/132; 374/117; 374/141
[58] Field of Search ..................................... 702/130, 132, 702/117; 326/39; 374/170, 141, 163, 117; 714/725

[56] References Cited

U.S. PATENT DOCUMENTS

| | | | |
|---|---|---|---|
| 4,210,024 | 7/1980 | Ishiwatari et al. | 73/362.5 |
| 4,493,565 | 1/1985 | Saka | 374/185 |
| 4,551,031 | 11/1985 | Ishikawa et al. | 374/117 |
| 4,658,407 | 4/1987 | Iwama | 377/25 |
| 5,214,668 | 5/1993 | Satou et al. | 374/117 |
| 5,388,134 | 2/1995 | Douglass et al. | 377/25 |
| 5,513,235 | 4/1996 | Douglass et al. | 377/25 |
| 5,638,418 | 6/1997 | Douglass et al. | 377/25 |
| 5,790,068 | 8/1998 | Conn, Jr. | 374/170 |
| 5,790,479 | 8/1998 | Conn | 368/118 |
| 5,836,691 | 11/1998 | Yamauchi | 374/117 |
| 5,890,100 | 3/1999 | Crayford | 702/130 |
| 5,899,570 | 5/1999 | Darmawaskita et al. | 374/170 |

FOREIGN PATENT DOCUMENTS

| | | | |
|---|---|---|---|
| 0207833 | 12/1982 | Japan | 374/170 |
| 0256299 | 11/1986 | Japan | 374/170 |
| 404225050 | 8/1992 | Japan | 374/170 |

OTHER PUBLICATIONS

"The Programmable Logic Data Book," (1994), available from Xilinx, 2100 Logic Drive, San Jose, California, Chapters 7 and 8.

*Primary Examiner*—Patrick Assouad
*Attorney, Agent, or Firm*—Arthur J. Behiel; Jeanett S. Harms

[57] ABSTRACT

A method is described for measuring localized operating temperatures and voltages on an integrated circuit. The integrated circuit includes an oscillator circuit with a frequency that varies with temperature and/or applied voltage. The frequency of the oscillator is then determined, using a constant voltage, for a number of temperatures to establish a known relationship between oscillation frequency and temperature. Once the relationship is known, a similar oscillator is included within or adjacent a second circuit of the integrated circuit. The operating temperature or operating voltage of the second circuit may then be determined by monitoring the frequency of the oscillator while the second circuit is operational.

20 Claims, 8 Drawing Sheets

6,067,508

METHOD AND APPARATUS FOR MEASURING LOCALIZED TEMPERATURES ON INTEGRATED CIRCUITS

RELATED APPLICATIONS

This application is a divisional of U.S. patent application Ser. No. 09/047,192 entitled "Method and Apparatus for Measuring Localized Voltages on Programmable Integrated Circuits" filed Mar. 24, 1998, now U.S. Pat. No. 6,002,991 which is a divisional of U.S. Pat. No. 5,795,068 entitled "Method and Apparatus for Measuring Temperatures on Programmable Integrated Circuits" filed Aug. 30, 1996 and issued Aug. 18, 1998.

FIELD OF THE INVENTION

The present invention relates generally to methods of measuring localized operating temperatures and/or operating voltages on integrated circuits.

BACKGROUND

The operating temperature of an integrated circuit (IC) affects both the life and the speed performance of the IC. Hence, manufacturers specify IC speed performance in terms of operating speed at a particular temperature and voltage.

IC operating temperatures are typically estimated by measuring package temperature. This method is imprecise for a number of reasons. First, different regions of an IC can dissipate substantially different levels of power, resulting in substantially different localized temperature differences; methods that rely on package temperature to estimate IC operating temperature are not capable of resolving these localized differences. Second, the thermal impedance $\theta_{jc}$ between the IC and the case is difficult to estimate. It is therefore necessary to factor in a margin of error to take into account the possibility of significant localized temperature differences that are not identified when measuring package temperature.

Several conventional temperature-sensing methods enable IC designers to identify relatively hot regions ("hot spots"), thereby allowing designers either to more accurately assess the speed performance of a given IC or to eliminate hot spots by redesigning the IC so that power-intensive circuitry is distributed more evenly.

According to one method, one or more dedicated temperature-sensing diodes are incorporated into the design of the IC. According to the method, a constantcurrent source supplies a diode while the voltage across the diode is measured. The temperature of the diode, and therefore the temperature of the region in which the diode is located, is then calculated using well-known relationships between current, voltage, and temperature exhibited by diodes. Unfortunately, such temperature sensing diodes and their requisite connections must be distributed over a given IC if the temperatures of the various regions are to be measured. Moreover, the constant current source and the voltage measurement must be very accurate if temperature is to be accurately determined.

According to a second method for identifying hot spots, a substrate containing an IC is coated with temperature-sensitive materials that change color with changes in temperature. Hot spots are located by viewing the warm IC and associating the resulting colors with temperature. This method is not always practical because the IC package must open to expose the substrate.

In light of the foregoing, there exists a need for a non-invasive method for measuring the temperatures of localized regions of an IC. More particularly, there exists a need for a method of assessing the speed performance of various discrete regions on programmable logic devices without using dedicated circuitry.

SUMMARY

A method is described for measuring localized operating temperatures on integrated circuits. In accordance with the inventive method, an IC is configured to include a temperature-sensing circuit on a region of the IC in which the temperature of the IC is of interest.

The temperature-sensing circuit has some characteristic, such as oscillation frequency, that varies with temperature according to a known relationship. This characteristic is monitored and recorded for a number of IC temperatures to establish a known relationship between the characteristic and the temperature of the temperature-sensing circuit.

Once the relationship is known, the operating temperature of the region within which the temperature-sensing circuit is located may be determined by measuring the characteristic and applying the measured value to the known relationship. The IC may include additional temperature-sensing circuits in other regions of the IC; thus, localized temperatures may be determined for any region of the IC.

In an embodiment of the invention applicable to programmable logic devices, the temperature-sensing circuit is an oscillator implemented with programmable logic resources. Because circuits implemented using programmable logic devices do not generally require all of the resources available on such devices, such oscillators may be added without effecting the principal functions of the programmable logic device.

In yet another embodiment, an oscillator used as the temperature-sensing circuit is also used to measure localized supply voltage variations on an IC that result from different regions requiring more power than others and from differences in supply line impedance to different regions on an IC. A relationship between oscillation frequency and supply voltage is first established for the oscillator operating alone. Adjacent circuits in the region of interest are then turned on. The loading effects of the circuits in the region of interest decrease the supply voltage to the region of interest, thereby decreasing the oscillation frequency of the oscillator. Before the operation of the circuitry affects IC temperature significantly, the oscillation frequency of the oscillator is measured and the localized supply voltage is determined.

DETAILED DESCRIPTION

Figure 1:
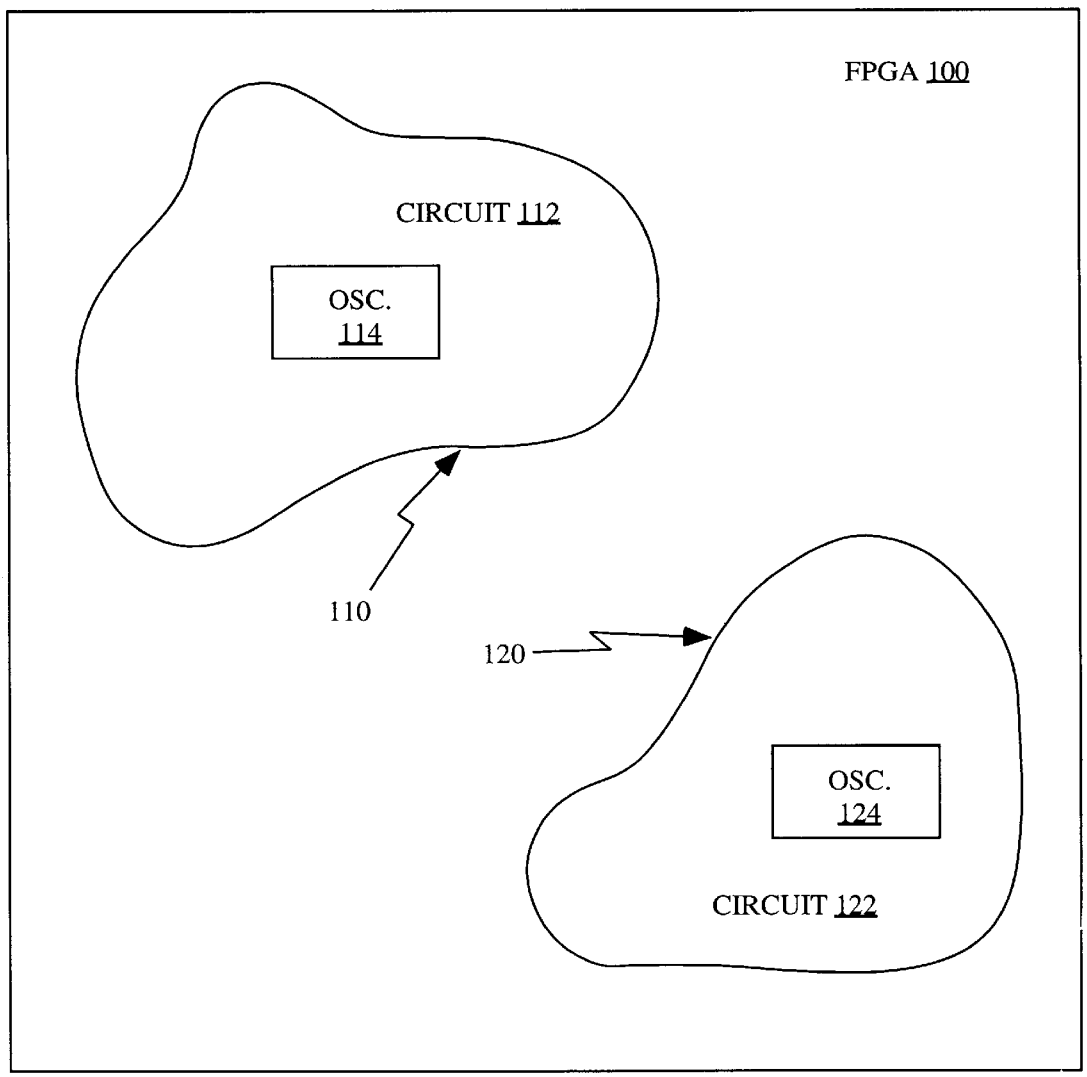
FIG. 1 represents a field-programmable gate array (FPGA) 100.

FIG. 1 represents a field-programmable gate array (FPGA) 100, which includes a programmable first region 110 and a programmable second region 120. First region 110 is conventionally programmed to implement a first logic circuit 112, and second region 120 is conventionally programmed to implement a second logic circuit 122.

In accordance with the present invention, first region 110 is programmed to include a calibration oscillator 114, and second region 120 is similarly programmed to include a second calibration oscillator 124. Each of oscillators 114 and 124 oscillates at an oscillation frequency that varies with temperature according to a known relationship. Thus, the oscillation frequencies of oscillator circuits 114 and 124 may be measured to determine the respective operating temperatures of first region 110 and first region 120. Other calibrated oscillator circuits (not shown) may be located elsewhere on FPGA 100 to determine the temperatures of those locations.

Sensing the operating temperatures of various regions on FPGA 100 allows circuit designers to identify hot spots on FPGA 100 and, where necessary, reprogram FPGA 100 to operate more efficiently. For example, where two relatively power-intensive (and therefore relatively hot) logic circuits are programmed to exist adjacent one another on FPGA 100, a circuit designer can reprogram FPGA 100 so that those two circuits are located in opposite corners of FPGA 100. Such reconfiguration can distribute heat more effectively across FPGA 100, thereby decreasing the temperature of the hottest—and therefore slowest—region of FPGA 100. In addition, reducing the temperature of the hottest region of FPGA 100 advantageously increases the life expectancy of FPGA 100.

Figure 2:
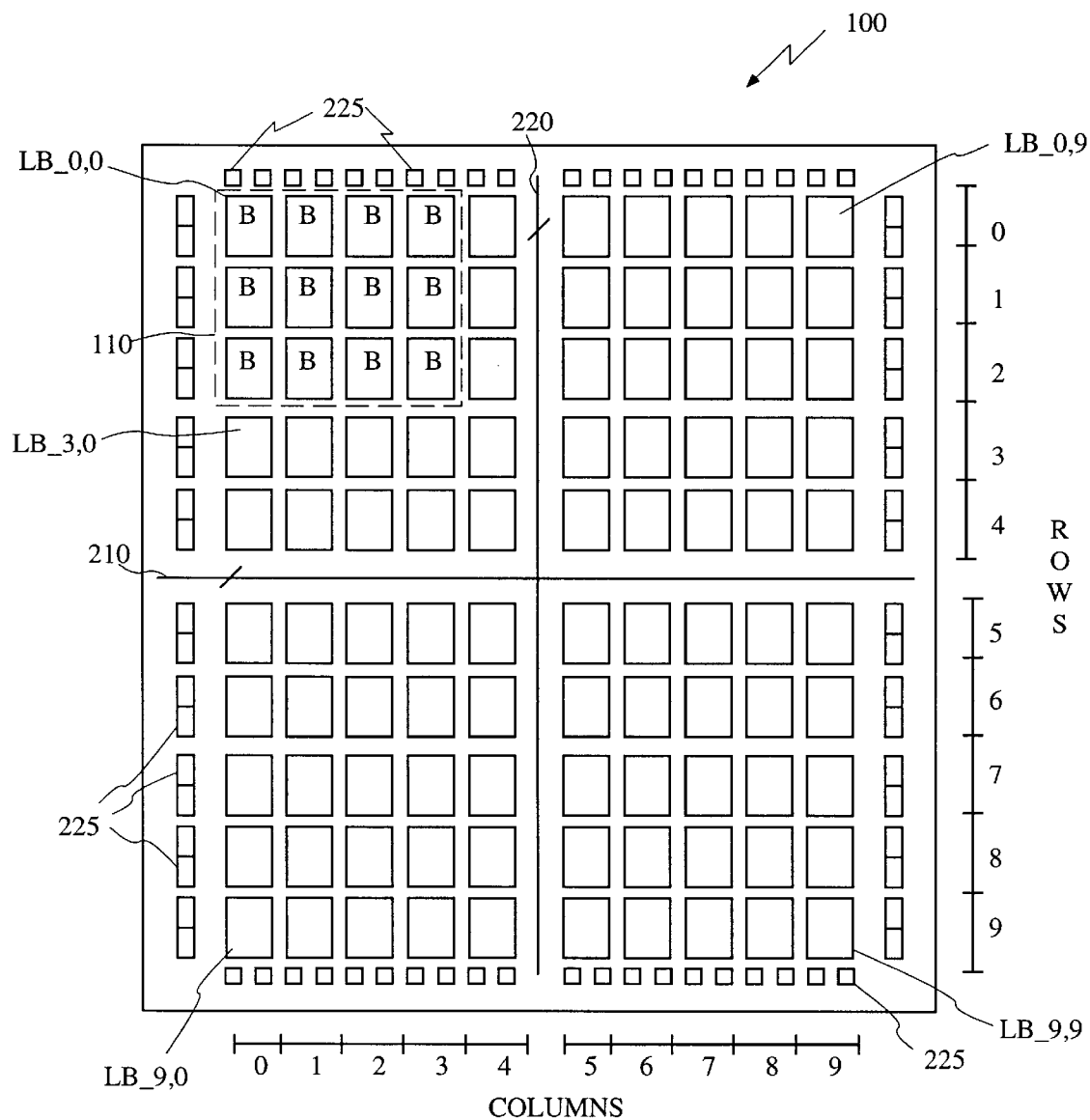
FIG. 2 is a block diagram of an embodiment of FPGA 100.

FIG. 2 is a block diagram of an embodiment of FPGA 100. In the embodiment of FIG. 2, FPGA 100 contains a matrix of 100 (10 rows by 10 columns) identical logic blocks $LB_{13}$ 0,0 to LB_9,9. For illustrative purposes, each logic block of region 110 is shown to include a character "β" signifying that the logic blocks of region 110 together perform the logic function of logic circuit 112. For the present example, the remaining function blocks are assumed to be unconfigured.

While FPGA 100 is shown to include 100 logic blocks, other FPGAs are available for applications that demand different numbers of logic blocks. For example, the XC4013™ device, available from Xilinx, Inc., includes a matrix of 576 (24 rows by 24 columns) logic blocks.

Each of logic blocks LB_0,0 to LB_9,9 is uniquely specified by row and column. Selected peripheral ones of logic blocks LB_0,0 to LB_9,9 are labeled in FIG. 2 for illustrative purposes. Horizontal conductors 210 and vertical conductors 220 may be programmed to connect logic blocks LB0,0 to LB9,9 to one another, or to selected ones of input-output (I/O) blocks 225.

Logic blocks $LB\_00$ to $LB\_9,9$, horizontal conductors 210, vertical conductors 220, and I/O blocks 225 are conventionally programmable to implement user-selected logic designs. Such designs generally start as a block diagram, a schematic, or an HDL description, and may be constructed using a number of popular computer-aided engineering tools, e.g. ViewDraw available from ViewLogic, Inc., of Marlboro Mass. After schematic- or equation-based entry, the design is automatically converted to a conventional netlist. That is, software partitions the design into logic blocks, determines the placement for each logic block, and then selects the interconnect routing.

The process of partitioning, placement, and routing is generally done automatically; however, a circuit designer may also affect the placement and configuration of circuits by imposing specific design constraints or by selectively editing critical portions of the design using, for example, a graphic design editor. The process of programming and configuring FPGAs is well known. For a detailed description of the process, see chapters 7 and 8 of *The Programmable Logic Data Book* (1994), available from Xilinx, Inc., which is incorporated herein by reference.

Figure 3:
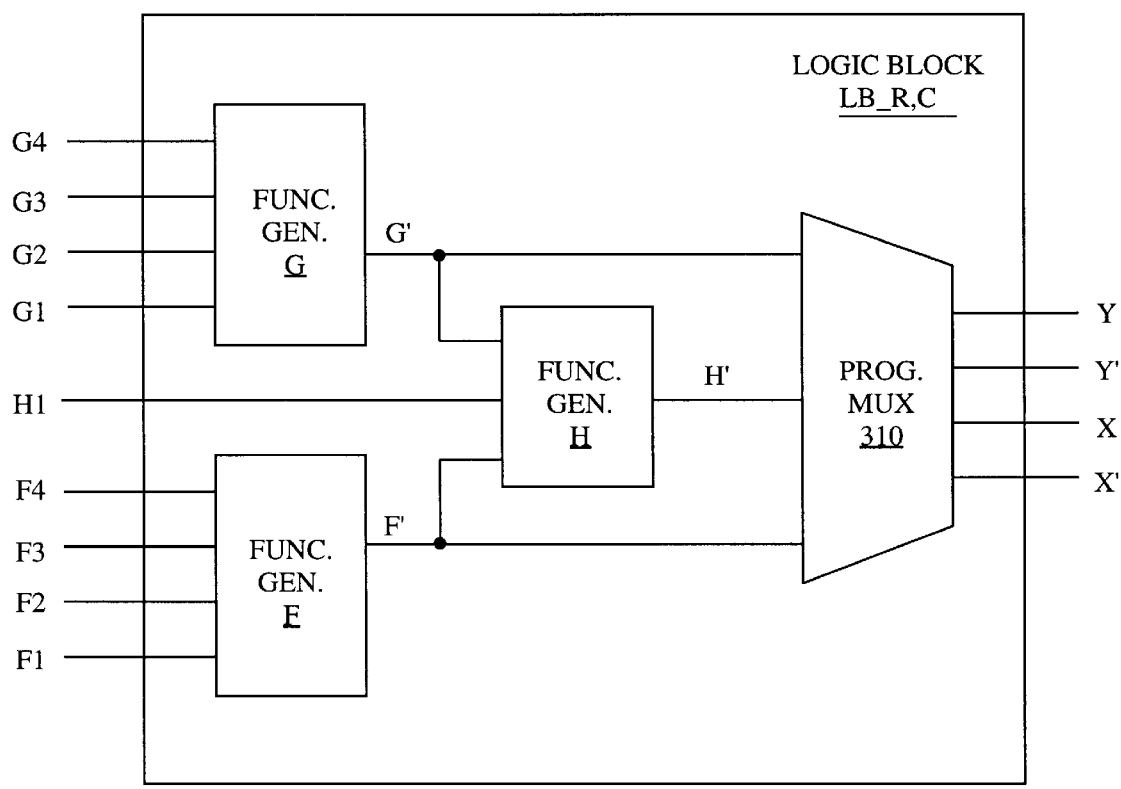
FIG. 3 is a block diagram of a representative logic block LB_R,C of FPGA 100.

FIG. 3 is a block diagram of a conventional representative logic block LB_R,C of FPGA 100 (the "R" and "C" are variables for row and column, respectively). Logic block LB_R,C includes a function generator G, a function generator F, a function generator H, and a programmable multiplexer 310. Four independent input terminals are provided to each of function generators G and F (G1–G4 and F1–F4, respectively). A single input terminal H is provided to function generator H1.

Function generators G and F are each capable of implementing any arbitrarily defined Boolean function of their respective four input terminals. Function generator H can implement any Boolean function of its three input terminals H1, G' and F'. Output terminals G', H' and F' of function generators G, H, and F respectively are programmably multiplexed through programmable multiplexer 310 to provide signal on lines Y, Y', X, and X'.

By conventionally specifying the functions of function generators F, G, and H and programmable multiplexer 310, logic block LB_R,C can be programmed to implement any two independent functions of up to four variables, any single function of five variables, or any function of four variables together with some functions of five variables. Logic block LB_R,C is also capable of implementing some functions of up to nine variables. The operation of logic block LB_R,C is described in detail in chapter 8 of the above-incorporated *"Programmable Logic Data Book."*

Figure 4A:
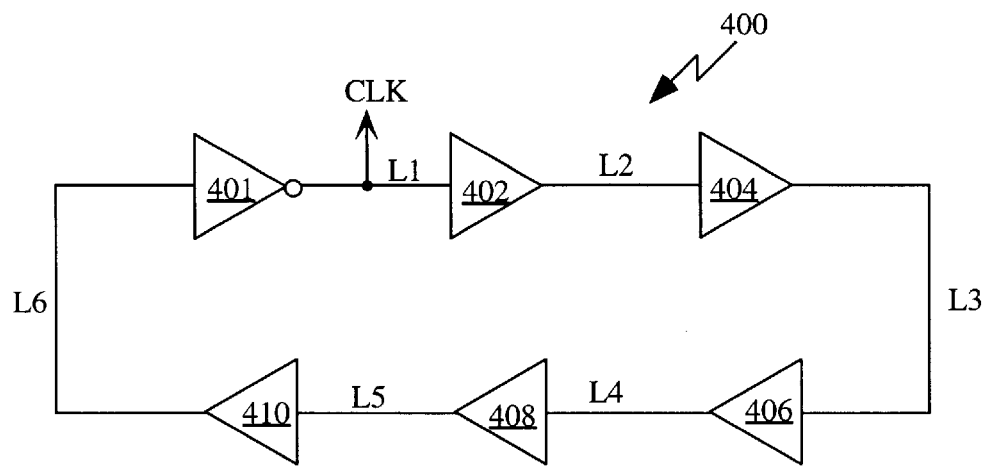
FIG. 4A is a schematic diagram of a ring oscillator 400.

FIG. 4A is a schematic diagram of a ring oscillator 400. Ring oscillator 400 includes an inverter 401 having an output terminal connected via a line L1 to the input terminal of a buffer 402, which in turn has an output terminal connected to an input of a buffer 404 via a line L2. Three additional buffers (406, 408, and 410) are similarly connected via lines L3, L4, and L5, respectively. An output terminal of buffer 410 is then connected to the input terminal of inverter 401 via a line L6.

When power is applied to ring oscillator 400, the output terminal of inverter 401 (line L1) provides a clock signal CLK. The oscillation frequency of the signal CLK depends upon the delay associated with inverter 401 and buffers 402, 404, 406, 408, and 410, and upon the delay imposed by the respective RC time constants of lines L1 through L6. Ring oscillators are well-known, and may be implemented in many other configurations. For example, a greater or lesser number of buffers may be used, or a different odd number of inverters may be used.

If the oscillation frequency of the signal CLK is too high, the frequency will become sensitive to changes in power supply voltage $V_{CC}$. Thus, ring oscillator 400 should be configured such that the clock signal on line CLK has ample time to oscillate between $V_{CC}$ and ground potential. In one embodiment, the oscillation frequency of the signal CLK is 50 MHz.

Figure 4B:
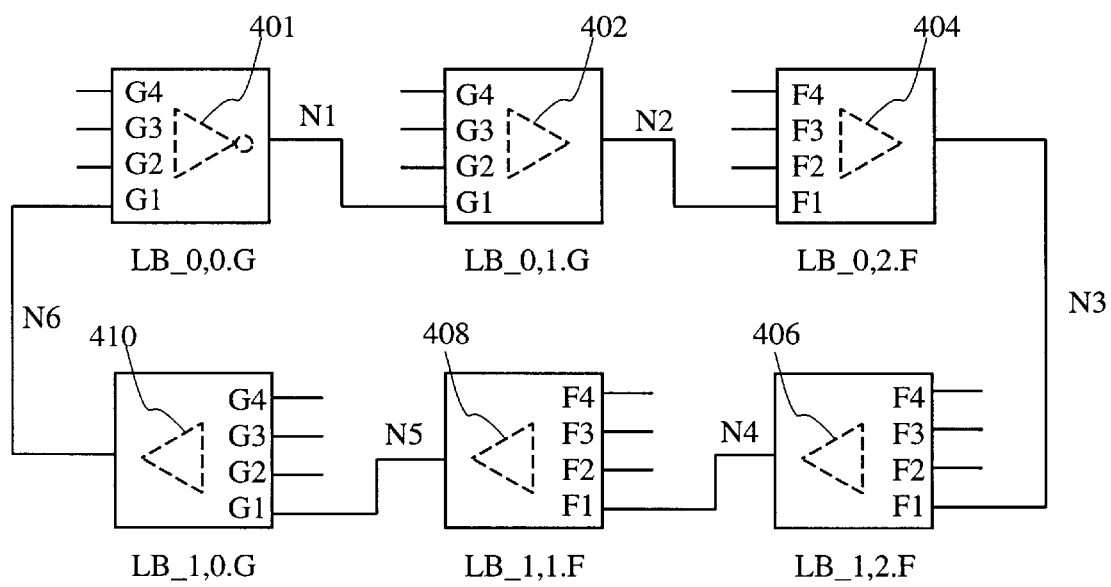
FIG. 4B is a schematic diagram of ring oscillator 400 represented using design software.

FIG. 4B is a schematic diagram of ring oscillator 400 represented using NeoCad Epic software commercially available from Xilinx, Inc. Inverter 401 and buffers 402, 404, 406, 408, and 410 are each implemented in a separate function generator within separate logic blocks. For example, inverter 401 is implemented using function generator G of logic block LB_0,0 (hence the descriptor "LB_0,0.G"). Lines L1 through L6 of FIG. 4A are implemented as programmable interconnect lines conventionally represented in FIG. 4B as nets N1 through N6.

Figure 5:
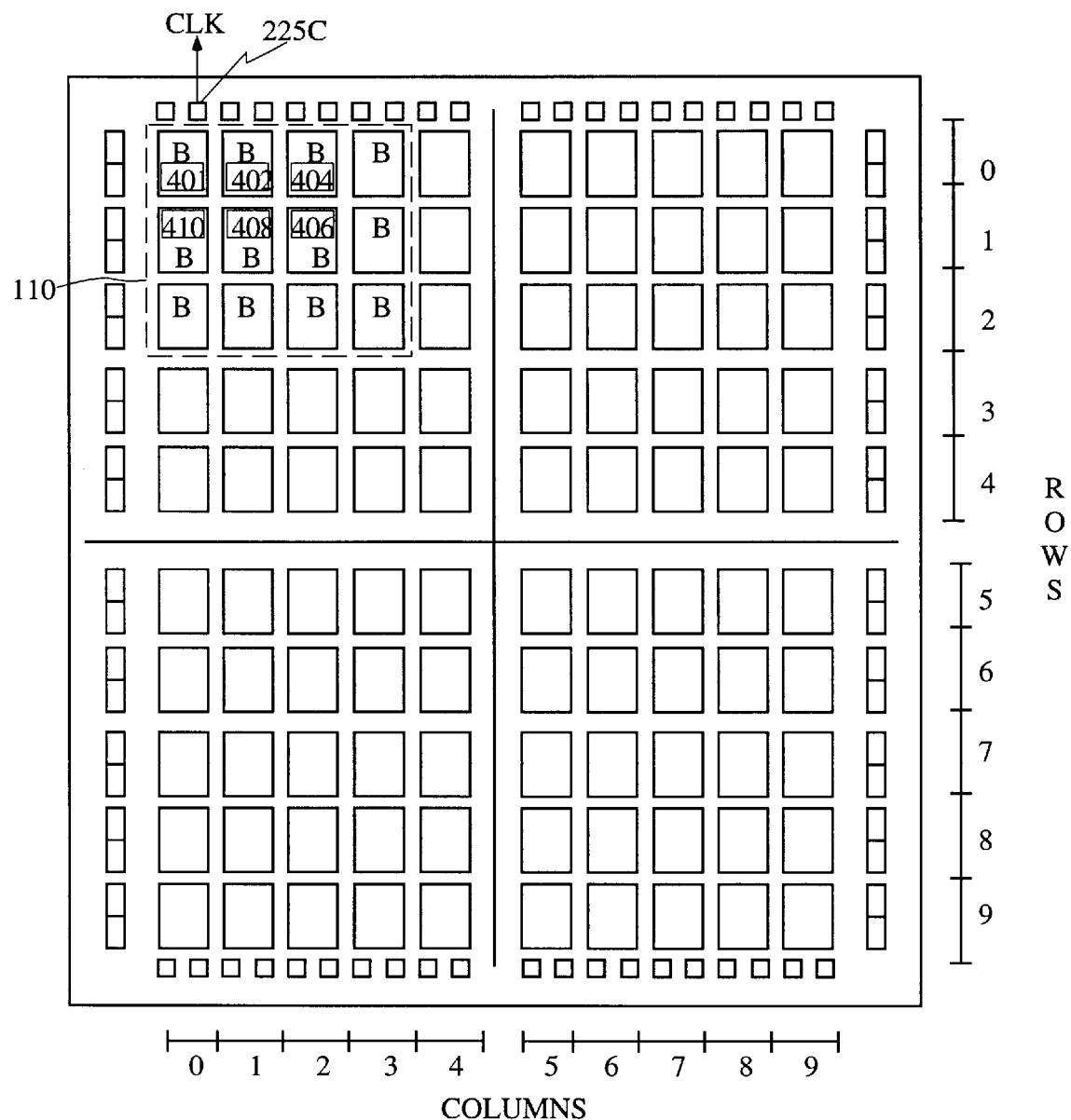
FIG. 5 is a diagram of FPGA 100 configured to include ring oscillator 400 per the implementation of FIG. 4B.

FIG. 5 is a diagram of FPGA 100 configured to include ring oscillator 400 per the implementation of FIG. 4B. For example, function block G of logic block LB_0,0 is programmed to implement the function of inverter 401. FPGA 100 is additionally configured so that net N1 is accessible via an input/output (I/O) pin 225C. Consequently, clock signal CLK is available on I/O pin 225C, allowing the frequency of ring oscillator 400 (i.e., the frequency of clock signal CLK) to be monitored. Also shown in FIG. 5, first region 110 is configured to include circuit 112 (FIG. 12 in the twelve function blocks designated with β) along with ring oscillator 400 (FIG. 4A).

Ring oscillator 400, imbedded within circuit 112, outputs clock signal CLK on I/O pin 225C. The frequency of clock signal CLK varies with temperature according to a known relationship established during a calibration process for ring oscillator 400. This calibration process used to establish the known relationship between the frequency of clock signal CLK and the temperature of ring oscillator 400 is described below in connection with FIGS. 6 and 7.

To determine the operating temperature of circuit 112 (i.e., the function blocks designated with β), FPGA 100 is first powered up and allowed to warm to its operating temperature. The temperature of ring oscillator 400 is then determined by relating the frequency of clock signal CLK to temperature using the known relationship between frequency and temperature. The temperature of ring oscillator 400 provides a very good estimate of the temperature of circuit 112 because of the close proximity of ring oscillator 400 and circuit 112.

Ring oscillator 400 dissipates a small amount of power, and therefore contributes to the temperature of region 110. However, ring oscillator 400 is a relatively simple circuit that requires few FPGA resources for implementation. Consequently, the temperature contribution of ring oscillator 400 is nominal. In addition, because circuits implemented using programmable logic devices do not generally require all of the resources available on such devices, simple circuits like ring oscillator 400 may be added without effecting the principal functions of FPGA 100.

In another embodiment, ring oscillator 400 is gated so that a circuit designer can turn ring oscillator 400 on or off. The temperature of region 110 may then be allowed to stabilize before ring oscillator 400 is turned on, thereby minimizing any temperature contribution from ring oscillator 400.

Additional oscillator circuits may be provided in various additional regions of FPGA 100 so that the frequencies—and therefore temperatures—of those other regions may be measured. If the same known relationship between frequency and temperature is used for more than one oscillator circuit, each oscillator circuit should be configured identically; otherwise, differences in frequency may result from different circuit configurations instead of from different operating temperatures.

Figure 6:
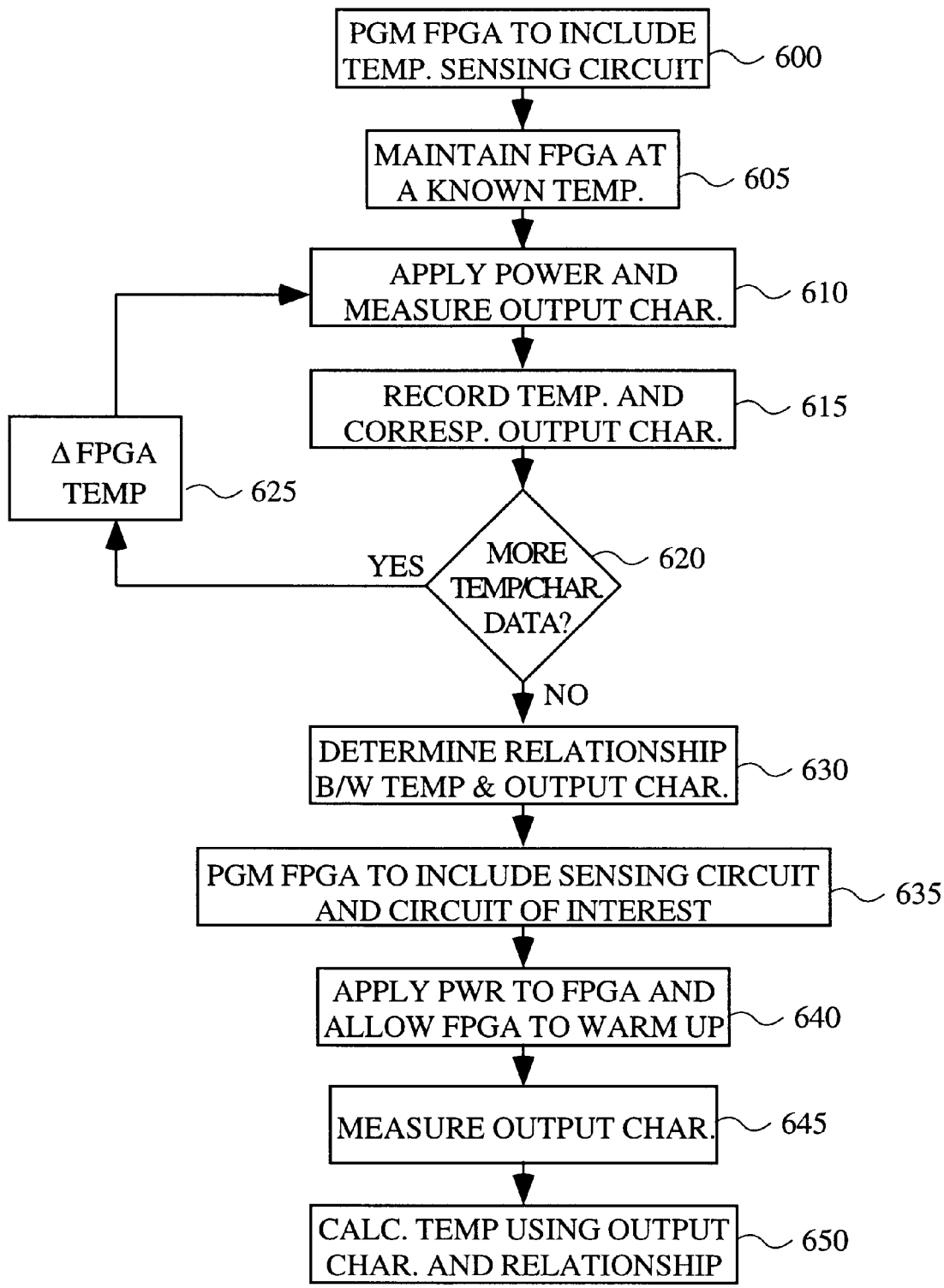
FIG. 6 is a flowchart illustrating the process of calibrating an oscillator circuit.

FIG. 6 is a flowchart illustrating the process of calibrating a temperature-sensing circuit (e.g., ring oscillator 400) and using the calibrated temperature-sensing circuit to determine the operating temperature of a localized region of an IC (e.g., first region 110). Beginning with operation 600, FPGA 100 is programmed to include a temperature-sensing circuit. In the example of FIG. 4A, the temperature-sensing circuit is a ring oscillator. Oscillators are excellent temperature-sensing circuits because their output characteristic (frequency) is easily measured and has excellent noise immunity. However, other types of temperature-sensing circuits may also be used.

Next, in operation 605, FPGA 100 is maintained at a known temperature, typically in a conventional adiabatic chamber or with a conventional hot probe. Once the temperature of FPGA 100 has reached equilibrium with the known temperature, power is applied to FPGA 100 (operation 610) and the output characteristic of the temperature-sensing circuit (e.g., frequency) is quickly measured before the operation of the temperature-sensing circuit effects a significant temperature change in FPGA 100. Such measurements are easily done when the temperature-sensing circuit is ring oscillator 400, for it typically takes less than 50 msec to measure the stable oscillation frequency of ring oscillator 400 once power is applied to FPGA 100.

The temperature and the corresponding output characteristic are recorded (operation 615) and power is removed from FPGA 100. If more data are required or desired, as determined in operation 620, then operation 625 changes the temperature of FPGA 100 to another known temperature. This operation is typically done by changing the temperature of the adiabatic chamber in which FPGA 100 is placed and allowing the temperature of FPGA 100, without power applied, to come to equilibrium with the temperature of the chamber. Power is then applied once again and the output characteristic measured (operation 610).

If a sufficient number of data points is obtained in operation 620, then the method moves to operation 630 in which a relationship between temperature and output characteristic is established using the data. Once this relationship is known, FPGA 100 is programmed to include a temperature-sensing circuit within or adjacent any circuit of interest for which it is desired to know the operating temperature (operation 635).

With both the temperature-sensing circuit and the circuit of interest programmed into FPGA 100, power is once again applied and FPGA 100 is allowed to warm up to its operating temperature (operation 640). The output characteristic of the temperature-sensing circuit is then measured (operation 645), and this measured output characteristic is applied (operation 650) to the relationship established in operation 630. The output characteristic combined with the relationship yields the operating temperature of the region of FPGA 100 that includes the circuit of interest.

In one embodiment the impact of the temperature-sensing circuit on operating temperature is minimized by keeping the temperature-sensing circuit turned off in operation 640 until the remaining circuitry within FPGA 100 is at its operating temperature. The output characteristic of the temperature-sensing circuit is then quickly measured in operation 645 before the temperature-sensing circuit has a significant impact on the operating temperature of FPGA 100.

Figure 7:
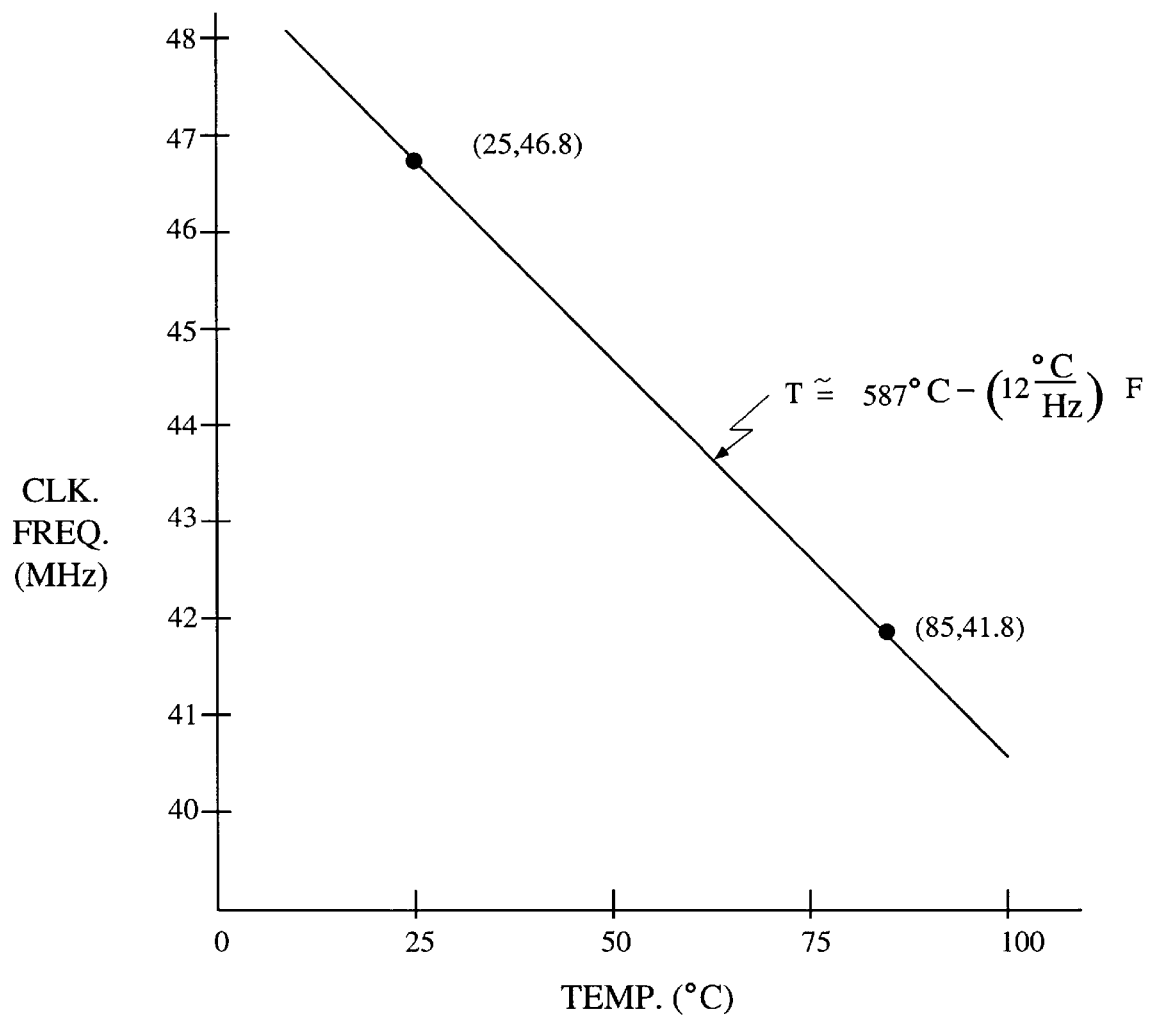
FIG. 7 is an empirically derived graph of temperature versus frequency for ring oscillator 400.

FIG. 7 is an empirically derived graph of temperature versus frequency for ring oscillator 400 implemented on a Xilinx XC4028EX3 ™ FPGA. The graph and the following discussion are an example of how one type of temperature-sensing circuit (ring oscillator 400) may be calibrated. Other temperature-sensing circuits may be calibrated using similar methods, as will be readily understood by those of skill in the art.

To obtain the graph of FIG. 7, the frequency of ring oscillator 400 was taken at temperatures of 25° C. and 85° C. and the oscillation frequency was plotted for each of those temperatures. The oscillation frequency of ring oscillator 400 is 46.8 MHz at 25° C. and 41.8 MHz at 85° C. A line drawn through those two points on the graph approximates the relationship between the frequency of oscillator 400 and the temperature of FPGA 100. This relationship may be expressed mathematically as:

Temperature=587° C.−[12(° C./Hz)×Frequency]

The temperature of FPGA 100 in the vicinity of ring oscillator 400 (or a similar configured ring oscillator) may be obtained by measuring the oscillation frequency of the ring oscillator and substituting the oscillation frequency into the foregoing known relationship. While only two data points are illustrated in FIG. 7, any number of additional data points may be determined to improve the accuracy of the relationship.

In another embodiment of the invention, an oscillator (e.g., ring oscillator 400) is used to measure localized supply voltage variations on FPGA 100. These variations result from different regions requiring more power than others and from differences in supply line impedance to different regions on an IC. Thus, with a power supply voltage $V_{CC}$ applied to FPGA 100, region 110 has a local supply voltage $V_{CC}'$ less than $V_{CC}$. How much less depends upon the amount of power used by circuit 112 and the impedance of the signal path from $V_{CC}$ to region 110.

Figure 8:
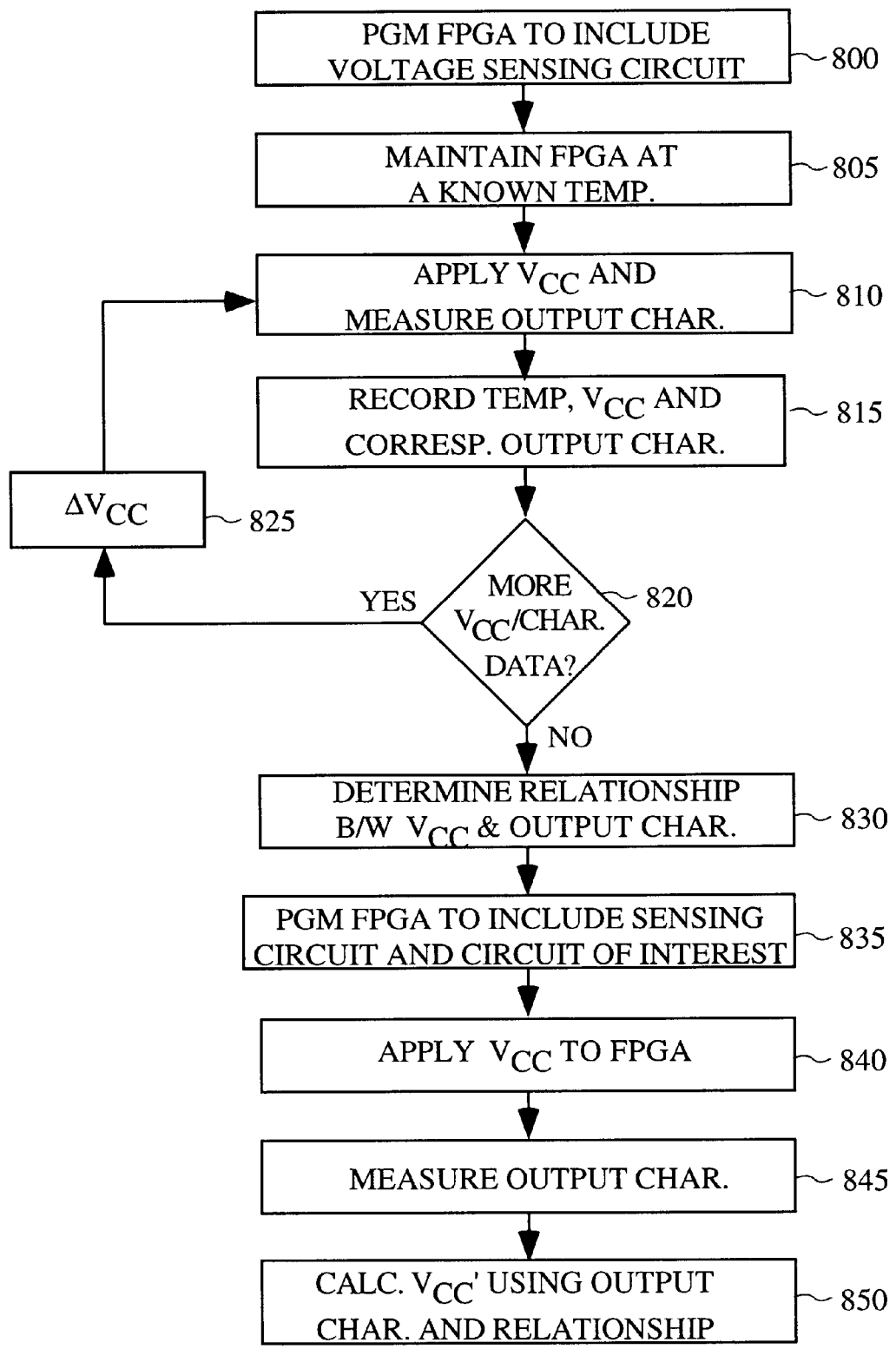
FIG. 8 is a flowchart illustrating the process of calibrating a voltage-sensing circuit.

FIG. 8 is a flowchart illustrating the process of calibrating a voltage-sensing circuit (e.g., ring oscillator 400) and using the calibrated voltage-sensing circuit to determine the operating voltage $V_{CC}'$ of a localized region of an IC (e.g., first region 110). Beginning with operation 800, FPGA 100 is programmed to include a voltage-sensing circuit. In one embodiment, the voltage-sensing circuit is a ring oscillator. Oscillators are excellent voltage-sensing circuits because their output characteristic (frequency) is easily measured and has excellent noise immunity. However, other types of voltage-sensing circuits may also be used. FPGA 100 may also be programmed to include circuit 112 during operation 800. However, circuit 112 is turned off while the relationship between $V_{CC}$ and the output characteristic of the voltage-sensing circuit is established.

Next, in operation 805, FPGA 100 is maintained at a known temperature, typically in a conventional adiabatic chamber or with a conventional hot probe. Once the temperature of FPGA 100 has reached equilibrium with the known temperature, a power supply voltage $V_{CC}$ is applied to FPGA 100 (operation 810) and the output characteristic of the voltage-sensing circuit (e.g., frequency) is quickly measured before the operation of the voltage-sensing circuit effects a significant temperature change in FPGA 100. Such measurements are easily done when the voltage-sensing circuit is ring oscillator 400, for it typically takes less than 50 msec to measure the stable oscillation frequency of ring oscillator 400 once power is applied to FPGA 100.

The applied power supply voltage $V_{CC}$ and the corresponding output characteristic are recorded (operation 815) and power is removed from FPGA 100. If more data are required or desired, as determined in operation 820, then operation 825 changes the power supply voltage $V_{CC}$ to another known voltage. Power is then applied once again and the output characteristic measured (operation 810).

If a sufficient number of data points is obtained in operation 820, then the method moves to operation 830 in which a relationship between the supply voltage $V_{CC}$ and the output characteristic is established using the data. The voltage-sensing circuit used (ring oscillator 400 in the present example) requires very little power; consequently, the local supply voltage $V_{CC}'$ is assumed to be very close to the true power supply voltage $V_{CC}$ so long as the remaining circuitry of FPGA 100 is turned off. Thus, the relationship between supply voltage $V_{CC}$ and the output characteristic closely approximates the relationship between local supply voltage $V_{CC}'$ (e.g., local to region 110) and the output characteristic.

Once the relationship local supply voltage $V_{CC}'$ and the output characteristic is known, FPGA 100 is programmed to include a voltage-sensing circuit within or adjacent any circuit of interest for which it is desired to know the local supply voltage $V_{CC}'$ (operation 835).

With both the voltage-sensing circuit and the circuit of interest programmed into FPGA 100, power is once again applied and FPGA 100 is allowed to warm up to its operating temperature (operation 840). The output characteristic of the voltage-sensing circuit is then measured (operation 845), and this measured output characteristic is applied (operation 850) to the relationship established in operation 830. The output characteristic combined with the relationship yields local power supply voltage $V_{CC}'$ of the region of FPGA 100 that includes the circuit of interest.

Although the present invention has been described in considerable detail with reference to certain preferred versions thereof, other versions are possible. For example, the present invention is not limited to use with FPGAs, but may also be used to measure localized temperatures in other types of programmable logic devices. The present invention is additionally applicable to non-programmable ICs, as where one or more temperature-sensing oscillators are included in the design of an IC. Therefore, the spirit and scope of the appended claims are not limited to the description of the preferred versions contained herein.

What is claimed is:

1. A method comprising:
   a. fabricating an integrated circuit to include:
      i. a first oscillator in a first one of a plurality of regions on the integrated circuit, the first oscillator having a first oscillation frequency that varies with temperature according to a first relationship; and
      ii. a second oscillator in a second one of the plurality of regions on the integrated circuit, the second oscillator having a second oscillation frequency that varies with temperature according to a second relationship;
   b. measuring the first and second oscillation frequencies of the respective first and second oscillators;
   c. determining a first temperature of the first region using the first oscillation frequency and the first relationship; and
   d. determining a second temperature of the second region using the second oscillation frequency and the second relationship.

2. The method of claim 1, further comprising determining the first relationship.

3. The method of claim 2, further comprising determining the second relationship.

4. The method of claim 2, wherein determining the first relationship comprises:
   a. maintaining the integrated circuit at a first known temperature; and
   b. measuring the oscillation frequency of the first oscillator to obtain a third oscillation frequency corresponding to the first known temperature.

5. The method of claim 4, wherein determining the first relationship further comprises:
   a. changing the temperature of the programmable logic device to a second known temperature; and
   b. measuring the oscillation frequency of the oscillator to obtain a forth oscillation frequency corresponding to the second known temperature.

6. The method of claim 1, wherein fabricating the integrated circuit includes forming a second circuit with the first oscillator in the first one of the plurality of regions.

7. The method of claim 6, further comprising:
   a. disabling the first oscillator; and
   b. enabling the second circuit.

8. The method of claim 7, further comprising:
   a. waiting, with the first oscillator disabled, for the temperature of the first region to stabilize;
   b. enabling the first oscillator; and
   c. measuring the frequency of the first oscillator.

9. The method of claim 6, wherein the first oscillator is embedded within the second circuit.

10. The method of claim 6, wherein fabricating the integrated circuit further includes forming a third circuit with the second oscillator in the second one of the plurality of regions.

11. The method of claim 10, further comprising:
   a. disabling the first and second oscillators; and
   b. enabling the second and third circuits.

12. The method of claim 11, further comprising:
   a. waiting, with the first and second oscillators disabled, for the temperatures of the first and second regions to stabilize;
   b. enabling the first and second oscillators; and
   c. measuring the respective frequencies of the first and second oscillators.

13. The method of claim 1, wherein the first relationship is substantially the same as the second relationship.

14. An integrated circuit comprising:
   a. a first logic circuit formed in a first region of the integrated circuit;
   b. a first oscillator formed in the first region, the first oscillator adapted to provide a first oscillating signal on a first oscillator output terminal, wherein the first oscillating signal has an oscillation frequency that varies with the temperature of the first region according to a first relationship;
   c. a second logic circuit formed in a second region of the integrated circuit;
   d. a second oscillator formed in the second region, the second oscillator adapted to provide a second oscillating signal on a second oscillator output terminal, wherein the second oscillating signal has an oscillation frequency that varies with the temperature of the second region according to a second relationship; and
   e. an output pin connected to at least one of the first and second oscillator output terminals, thereby making at least one of the first and second oscillating signals available on the output pin.

15. The integrated circuit of claim 14, wherein the first oscillator is embedded within the first logic circuit.

16. The integrated circuit of claim 15, wherein the second oscillator is embedded within the second logic circuit.

17. The integrated circuit of claim 14, further comprising a second output pin connected to the second oscillator output terminal, thereby making the second oscillating signal available on the second output pin.

18. A system for measuring the operating temperatures of first and second regions of an integrated circuit, the system comprising:
   a. a first logic circuit formed in the first region of the integrated circuit;
   b. a first oscillator formed in the first region, the first oscillator adapted to provide a first oscillating signal on a first oscillator output terminal, wherein the first oscillating signal has a first oscillation frequency that varies with the temperature of the first region according to a first relationship;
   c. a second logic circuit formed in the second region of the integrated circuit;
   d. a second oscillator formed in the second region, the second oscillator adapted to provide a second oscillating signal on a second oscillator output terminal, wherein the second oscillating signal has a second oscillation frequency that varies with the temperature of the second region according to a second relationship;
   e. an output pin of the integrated circuit connected to at least one of the first and second oscillator output terminals; and
   f. frequency monitoring means connected to the output pin of the integrated circuit.

19. The system of claim 18, further comprising a second output pin of the integrated circuit, wherein the first-mentioned output pin connects to the first oscillator output terminal and the second output pin connects to the second oscillator output terminal.

20. The system of claim 18, wherein the first oscillator is embedded within the first logic circuit.

* * * * *